United States Patent [19]

Potter et al.

[11] Patent Number: 4,613,527

[45] Date of Patent: Sep. 23, 1986

[54] PUR-COATING COMPOSITIONS WHICH ARE CROSS-LINKABLE UNDER HEAT, A PROCESS FOR THEIR PRODUCTION AND THEIR USE THEREOF AS AN ADHESIVE COAT FOR TEXTILES

[75] Inventors: Terry Potter, New Martinsville, W. Va.; Wilhelm Thoma, Leverkusen; Josef Pedain, Cologne, both of Fed. Rep. of Germany

[73] Assignee: Bayer Aktiengesellschaft, Leverkusen, Fed. Rep. of Germany

[21] Appl. No.: 678,527

[22] Filed: Dec. 5, 1984

[30] Foreign Application Priority Data

Dec. 13, 1983 [DE] Fed. Rep. of Germany ....... 3345071

[51] Int. Cl.$^4$ .............................................. B05D 1/36
[52] U.S. Cl. .................................. 427/412; 156/237; 156/331.3; 156/331.4; 525/450; 525/454; 525/456; 528/60
[58] Field of Search ................. 156/237, 331.3, 331.4; 427/412; 525/450, 456, 454; 528/60

[56] References Cited

U.S. PATENT DOCUMENTS 3,388,100 6/1968 Thoma et al. ......................... 528/60
4,035,213 7/1977 Thoma et al. ........................ 156/231
4,143,159 3/1979 Moller et al. ........................ 424/358
4,160,686 7/1979 Niederdellmann et al. ........ 427/412
4,308,184 12/1981 Thoma et al. ....................... 427/412

FOREIGN PATENT DOCUMENTS 1176164 10/1984 Canada .

*Primary Examiner*—John J. Gallagher
*Attorney, Agent, or Firm*—Gene Harsh; Joseph C. Gil; Thomas W. Roy

[57] ABSTRACT

The present invention relates to coating compositions based on polyurethane polymers and melamine- and/or urea-formaldehyde resins as cross-linking agents. At least a portion of the chain lengthening agent used to prepare the polyurethane polymers is based on 2,2-bis(-hydroxymethyl)propionic acid amide. By using this particular chain lengthening agent, the coating composition can be applied to textile substrates by the direct or reverse coating process and curved at lower temperatures.

The present invention additionally relates to the preparation of these coating compositions and to their use as the adhesive coat in preparing coated textile substrates by the direct or reverse coating process.

9 Claims, No Drawings

PUR-COATING COMPOSITIONS WHICH ARE CROSS-LINKABLE UNDER HEAT, A PROCESS FOR THEIR PRODUCTION AND THEIR USE THEREOF AS AN ADHESIVE COAT FOR TEXTILES

BACKGROUND OF THE INVENTION

1. Field of the Invention

The present invention relates to coating compositions based on polyurethane polymers and formaldehyde resins wherein at least a portion of the chain lengthening agent used to prepare the polyurethane prepolymer is 2,2-bis(hydroxymethyl)propionic acid amide. The present invention is also directed to the preparation of these coating compositions and their use as an adhesive coat in the direct or reverse coating of textiles.

2. Description of the Prior Art

The prior art has known for some time to coat textiles, such as woven cloth, worked cloth or webs with solutions of polyurethanes according to the direct or reverse coating process to produce synthetic leather and similar articles. The coating solutions may either contain urethane prepolymers which are reacted with polyfunctional cross-linkers to attain their final plastics properties and product properties (so-called two-component polyurethanes) or high molecular weight, fully reacted polyurethanes which already fully have their plastics properties (so-called one-component polyurethanes). The coatings which are thus obtained are used for the production of outer garments, leather bags, shoe upper material, tarpaulins, canvasses, upholstery and many other articles.

It is known from DE-OS No. 2,814,173 to combine prepolymers which contain urethane groups and have from 2 to 8 terminal OH—, —CONH$_2$ and/or ketoxime urethane groups with urea- or melamine-formaldehyde to produce a cross-linkable mixture. These products only attain their high molecular weight after the cross-linking reaction and prior to this have no mechanical strength. It is, however, often advantageous and desirable for coating compositions to have a certain degree of mechanical strength even before their passage through a drying channel.

It is, moreover, known from DE-OS No. 2,457,387 that specific polyurethane products based on aliphatic or cycloaliphatic polyisocyanates and hydrazine as the chain lengthening agent which are cross-linked with formaldehyde resins, have an advantageously soft, nappa leather feel. These coating compositions are, however, unsuitable for all uses.

The particular disadvantage of all known polyurethanes based on dihydroxy polyethers and/or polyesters and diisocyanates with diols and/or polyols as chain lengthening agents and which are hardened with melamine- and/or urea-formaldehyde resins, is the relatively high curing temperature (about 170° C.) which is required.

It is an object of the present invention to provide PUR-coating compositions, preferably in the form of solutions, which may be cured with formaldehyde resins at a relatively low temperature in a short period of time.

It has now been found that coating compositions can be produced which may be adequately cross-linked with formaldehyde resins at relatively low temperature and with a relatively short cross-linking time, if 2,2-bis(-hydroxymethyl)propionic acid amide is incorporated into the polyurethanes as the sole chain lengthening agent or in admixture with other chain lengthening agents.

2,2-bis(hydroxymethyl)propionic acid amide is known from DE-A No. 2,631,284 or DE-A No. 3,107,060. DE-A No. 2,631,284 describes the use of this substance as a skin moisturizing agent for cosmetic products. DE-OS No. 3,107,060 explains how to use the said compound to prevent the turbidity of a control or standard serum. An earlier use of the said amide in polyurethane chemistry in particular for PU-coating compositions which may be easily cross-linked by heat is not known.

SUMMARY OF THE INVENTION

The present invention is directed to coating compositions, preferably in dissolved form, which are cross-linkable under heat and contain a mixture of (A) substantially linear polyurethane polymers which are based on relatively high molecular weight polyols, diisocyanates and chain lengthening agents and (B) melamine- and/or urea-formaldehyde resins, characterized in that the polyurethane polymer (A) contains 2,2-bis(hydroxymethyl)propionic acid, preferably in a quantity of from about 0.5 to 10% by weight, based on the weight of the polyurethane polymer, as the sole chain lengthening agent or a portion thereof.

The present invention is also directed to a process for the production of coating compositions which are cross-linkable under heat, preferably in dissolved form, based on a mixture of (A) substantially linear polyurethane polymers, and (B) urea- and/or melamine-formaldehyde resins characterized in that substantially linear polyurethane polymers (A) are prepared, optionally in the presence of solvents, from relatively high molecular weight polyols, diisocyanates and chain lengthening agents which contain about 0.5 to 10%, by weight, of 2,2-bis(hydroxymethyl)propionic acid amide as the sole chain lengthening agent or in admixture with other low molecular weight chain lengthening agents, preferably diols, and mixed with the urea- and/or melamine-formaldehyde resins (B) and optionally conventional auxiliaries and additives.

The present invention is further directed to the use of the coating compositions which are cross-linkable under heat for coating textile substrates, leather or split leather, according to the direct or reverse coating process, preferably as an adhesive coating in the reverse coating process, by applying the coating compositions or preferably the solutions thereof in a quantity of about 10 to 300 g/m$^2$, preferably about 20 to 100 g/m$^2$, and subsequently heating them to about 110° to 160° C., preferably about 120° to 140° C., optionally with the removal of the solvents.

DETAILED DESCRIPTION OF THE INVENTION

Substantially linear polyurethanes which contain from about 0.75 to 7.5%, by weight, of the said amide as the sole chain lengthening agent or in admixture with other chain lengthening agents, preferably low molecular weight diols, are particularly preferred.

The polyurethanes according to the present invention are based on a relatively high molecular weight polyol or mixtures of relatively high molecular weight polyols which have, on average, two hydroxyl groups and a molecular weight of about 400 to 6000: a diisocyanate or mixtures of diisocyanates; and the above-mentioned amide as a chain lengthening agent, optionally with further chain lengthening agents, preferably low molecular weight diols and in particular butane diol-1,4.

The amide may be produced in a straightforward manner by reacting 2,2-bis(hydroxymethyl)propionic acid methyl ester and ammonia. The melting point of the substance which was used for the experiments which are described hereinafter is from 174° to 175° C. and is thus higher than described in DE-A No. 2,621,284, thereby indicating a purer preparation.

According to the present process it is possible to use release paper which is less expensive albeit more sensitive to the effects of temperature; moreover, the installation and energy costs of the cross-linking stage of the coatings is reduced. Furthermore low, effective cross-linking temperatures are indispensable when coating leather because otherwise the leather would harden at a temperature which is too high.

Conventional polyisocyanates, polyhydroxyl compounds and chain-lengthening agents, auxiliaries and additives are used as starting materials for the polyurethanes which may be produced according to the above-mentioned process. Organic solvents may be used which are conventional in polyurethane chemistry and include dimethylformamide, dimethylacetamide, alkyl esters of low carboxylic acids such as ethyl acetate or butyl acetate, aromatic hydrocarbons such as benzene or chlorobenzene, ethers such as diethylether,tetrahydrofuran, dioxane, methyl glycol acetate and similar solvents, and optionally mixtures of these solvents.

Conventional known compounds are suitable as polyisocyanates for the process according to the present invention. Aliphatic, cycloaliphatic, araliphatic, aromatic and heterocyclic polyisocyanates which have an NCO functionality of preferably 2, such as those described by W. Siefken, Liebigs Ann. Chem. 562, 75 (1948), are used as starting constituents. The isocyanates may contain an aliphatic hydrocarbon radical having from 2 to 18, preferably from 6 to 10 carbon atoms; a cycloaliphatic hydrocarbon radical having from 4 to 15, preferably from 5 to 10 carbon atoms; an aromatic hydrocarbon radical having from 6 to 15, preferably from 6 to 13 carbon atoms; or an araliphatic hydrocarbon radical having from 8 to 15, preferably from 8 to 13 carbon atoms. The aromatic or cycloaliphatic rings may be substituted by alkyl groups, preferably up to 4 alkyl groups each of which has from 1 to 4 carbon atoms. Examples include 1,4-tetramethylene diisocyanate, 1,6-hexamethylene diisocyanate, 1,12-dodecane diisocyanate, cyclobutane-1,4-diisocyanate, cyclohexane-1,3- and -1,4-diisocyanate, 1-isocyanato-3,3,5-trimethyl-5-isocyanatomethyl-cyclohexane, 2,4- and 2,6-hexahydrotoluylene diisocyanate, 3,3',5,5'-tetraethyl-dicyclohexylmethane-4,4'-diisocyanate, 3,3'-dimethyldicyclohexylmethane-4,4'-diisocyanate, perhydro-2,4'-and -4,4'-diphenylmethane diisocyanate, 1,3- and 1,4-phenylene diisocyanate, 2,4-and/or 2,6-toluylene diisocyanate, diphenylmethane-2,4'-, 4,4'- and/or 2,2'-diisocyanate, naphthylene-1,5-diisocyanate and mixtures thereof including mixtures of the isomers in the case of isomeric compounds (or the homologues thereof in the case of cycloaliphatic compounds).

Preferred polyisocyanates are the diisocyanates which are commercially readily available such as p-phenylene diisocyanate, diphenylmethane diisocyanates, toluylene diisocyanates, naphthalene-1,5-diisocyanate, isophorone diisocyanate, hexamethylene diisocyanate and trimethyl-hexamethylene diisocyanate, optionally as a mixture of the isomers or homologues thereof or as a mixture of various diisocyanates.

Polyesters, polyester amides, polyethers, polyacetals and polycarbonates, which are conventionally used in the production of polyurethanes, are suitable as relatively high molecular weight polyhydroxy compounds. Compounds having two hydroxyl groups per molecule are preferably used, especially those which have an average molecular weight ranging from about 400 to 6000, preferably from about 800 to 3000.

The polyesters containing hydroxyl groups which are suitable for the process according to the present invention are reaction products of multihydric, preferably dihydric and optionally additionally trihydric alcohols and multi-basic, preferably di-basic carboxylic acids.

The corresponding polycarboxylic acid anhydrides or corresponding polycarboxylic acid esters of low molecular weight alcohols or mixtures thereof may be used instead of the free polycarboxylic acids for the production of the polyesters. The polycarboxylic acids may be of an aliphatic, cycloaliphatic, aromatic and heterocyclic nature. Polyesters which may be used are, for example, those described in Houben-Weyl-Miller, XIV/2, P 12-29, Thieme, Stuttgart 1963.

The following are examples of carboxylic acids of this type and the derivatives thereof: oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, diethyl succinic acid and 1,4-cyclohexane dicarboxylic acid.

The following are examples of suitable hydroxy compounds: ethylene glycol, diethylene glycol, triethylene glycol, 1,2- and 1,3-propane diol, 1,4-, 1,3- and 2,3-butane diol, 1,5-pentane diol, 1,6-hexane diol, 1,8-octane diol, neopentyl glycol, 1,4-bis-(hydroxymethyl)-cyclohexane and 2-methyl-1,3-propane diol. To a lesser extent ($\leq$about 5 mol %) higher functional polyols, such as glycerine, trimethylol propane, 1,2,6-hexanetriol, 1,2,4-butanetriol, pentaerythritol or sorbitol may also be used. Polyesters which have double or triple bonds such as unsaturated fatty acids may also be used, as well as polyesters based on lactones such as $\epsilon$-caprolactone or of hydroxycarboxylic acids such as $\omega$-hydroxycaproic acid.

Linear polyethers which preferably have two hydroxyl groups such as addition products of alkylene oxides and starting compounds may also be used according to the present invention as relatively high molecular weight polyhydroxy compounds. Ethylene oxide, propylene oxide, butylene oxide, tetrahydrofuran, styrene oxide and epihalohydrins are suitable, for example, as alkylene oxides and these may also be used in the form of the mixtures thereof or may be used sequentially (e.g. propylene oxide and subsequently ethylene oxide for forming the end groups).

Compounds which may be used as initiators for the polyethers include water, diols and/or polyols (such as ethylene glycol, 1,2- and 1,3-propane diol, 2,2-bis-(4-hydroxyphenyl)-propane and the mixtures thereof) or diamines and/or polyamines (such as ethylene diamine or isophorone diamine).

Polyacetals may also be used as the relatively high molecular weight polyhydroxyl compounds and are produced, for example, by condensing formaldehyde or another aldehyde with multifunctional alcohols of the above-mentioned type. Polycarbonates which are known and may be produced from diols and either diphenyl carbonate or phosgene, may also be used.

Low molecular weight chain lengthening agents having isocyanate-reactive hydrogen atoms may optionally be used in combination with 2,2-bis(hydroxymethyl)-propionic acid amide and the above-mentioned relatively high molecular weight polyhydroxy compounds. These chain lengthening agents react at least difunctionally with isocyanates and have molecular weights of 32 to 399. Low molecular weight diols, amino alcohols and/or diamines, hydrazines or hydrazide compounds are preferably suitable for this purpose.

The following are examples of suitable chain lengthening agents which may be used according to the present invention: diols which have a molecular weight ranging from 62 to 399, preferably from 62 to 254, such as ethylene glycol, 1,2- and 1,3-propane diol, 1,4-, 1,3- and 2,3-butane diol, 1,5-pentane diol, 1,6-hexane diol, 1,8-octane diol, neopentyl glycol, 1,4-bis-(hydroxymethyl)-cyclohexane, 2-methyl-1,3-propane diol, diethylene glycol, triethylene glycol, tetraethylene glycol, dipropylene glycol, 4,4'-dihydroxydiphenylpropane and N-methyl diethanolamine. The following are also suitable: ethanolamine, diethanolamine, 3-aminopropanol, ethylene diamine, 1,4-tetramethylene diamine, 1,11-undecamethylene diamine, 1,12-dodecamethylene diamine, 1-amino-3-aminomethyl-3,5,5-trimethyl cyclohexane, 1,4-diamino cyclohexane, 2,4- and 2,5-hexahydro toluylene diamine, 2,4'- and 4,4'-diaminodicyclohexyl methane, 1-amino-2-aminomethyl-3,3,5(3,5,5)-trimethylcyclopentane, toluylene diamine, p-xylylene diamine, 4,4'-diaminodiphenyl methane, hydrazine, methyl hydrazine, N,N-dimethyl hydrazine and the homologues thereof. The amine- or hydrazine-based chain lengthening agents are preferably used in a minor quantity in addition to the 2,2-bis(hydroxymethyl)propionic acid amide and diols (preferably less than 50 mol % of the total chain lengthening agent).

2,2-bis(hydroxymethyl)propionic acid amide is preferably used as the sole chain lengthening agent or in admixture with low molecular weight diols in the adhesive coating compositions. When using diols or diamines in admixture the 2,2-bis(hydroxymethyl) propionic acid amide must be present in a quantity of 0.5-10% by weight, based on the weight of the polyurethane polymer.

The preferred polyurethane solutions which have a concentration of about 20 to 80% by weight and, in particular, about 30 to 70% by weight, are produced according to the present process by adding the polyisocyanates to the solution of the relatively high molecular weight polyols and low molecular weight chain lengthening agents (optionally in the presence of a portion of the solvent). As the reaction progresses and the viscosity increases the solution may optionally be diluted in portions until the desired final concentration is reached. The reaction temperature generally ranges from about 30° to 130° C., preferably from about 50° to 100° C. The chain length of the polyurethanes and the viscosity thereof may optionally be increased by subsequent addition of small quantities of polyisocyanate.

As an alternative it is possible to first of all react the relatively high molecular weight polyols with the diisocyanates (optionally in some of the solvent) in a two-stage reaction. The polymer chain is subsequently lengthened and the viscosity is increased with the above-mentioned low molecular weight chain lengthening agents: then dilution is optionally carried out as described above until the desired final concentration is attained.

The PUR-coating compositions may also be produced by the known variations of the process such as the simultaneous use of small quantities of chain terminators or higher functional compounds.

As was previously mentioned, the quantities of the polyisocyanates on the one hand and the 2,2-bis-(hydroxymethyl)propionic acid amide as well as the relatively high molecular weight polyols and chain lengthening agents on the other hand are chosen to provide a ratio of isocyanate groups to isocyanate-reactive hydrogens, preferably hydroxyl groups of about 0.8:1 to 1.2:1, preferably about 0.95:1 to 1.05:1. The ratio of hydroxyl groups of the relatively high molecular polyols to the isocyanate-reactive hydrogen atoms of the chain extending agents lies between 1:0,05 and 1:5, preferably 1:0,05 and 1:1,75, mostly preferred between 1:0,10 and 1:1.

To produce stable solutions oximes according to DE-A No. 3,142,706 may be used as chain terminating agents. Accordingly, low molecular weight, aliphatic, cycloaliphatic, or araliphatic monooximes which have a molecular weight ranging from 73 to 325 and preferably from 73 to 141 are used. Examples include acetone oxime, butanone oxime, 3-methylbutanone oxime, 3,3-dimethylbutanone oxime, 2-pentanone oxime, 4-methyl-2-pentanone oxime, cyclopentanone oxime, 2,2,4(2,4,4)-trimethylcyclopentanone oxime, cyclohexanone oxime or acetophenone oxime. Butanone oxime is preferably used.

It is advantageous if the NCO content is less than about 0.4% by weight, preferably less than about 0.25% by weight and most preferably less than about 0.15% by weight, prior to the addition of oxime for chain termination. A quantity of oxime which is at least equivalent to the isocyanate content is required for chain termination of the polyaddition reaction, and generally an excess monooxime is added. The quantity which is used to terminate the chain generally ranges from about 0.05 to 2% by weight of oxime, based on solid substance, and preferably ranges from about 0.08 to 1% by weight. Excess reagent does not have a negative effect and behaves like a solvent.

Conventional auxiliaries and additives such as pigments, dyes, fillers, antioxidants, light-protection agents, UV-absorbers, gripping agents, mold-release agents and plasticizers may be added to the coating compositions.

About 2 to 20% by weight, preferably about 5 to 5% by weight, based on the solids content of the coating composition, of urea- and/or melamine-formaldehyde resins are used to cross-link the coating compositions according to the present invention. Conventional catalysts may also be present. Cross-linkers of this type are known in the coating industry and are described, by way of example, in DE-A No. 2,457,387 (US-PS No. 4,035,213) and 1,719,324 and in particular in US-PS No. 3,242,230.

Small quantities (up to about 10% by weight, preferably from about 1 to 5% by weight, based on formaldehyde resin) of acids such as phosphoric acid, acid salts of phosphoric acid, maleic acid or p-toluene sulphonic acid may be added in known manner as catalysts for cross-linking the formaldehyde resins. The formaldehyde resin and the catalyst are preferably used in the absence of organic solvent (thus pure or in aqueous solution), but may also be dissolved in DMF or alcohols such as i-propanol or butanols.

Polyfunctional, optionally masked polyisocyanates, may also be used (preferably in a quantity of up to about 50% of the total quantity of cross-linker) along with the formaldehyde derivatives as cross-linkers. In many instances this produces particularly favorable properties in the coatings.

As already mentioned, the coating compositions according to the present invention are particularly suitable for coating textile substrates, leather or split leather. Although the quantity to be applied may fluctuate within broad limits, the quantity generally ranges from bout 10 to 300 g/m² and preferably from about 20 to 100 g/m². The coating compositions may either be applied according to the direct coating process or preferably according to the reverse coating process.

Of course it is also possible to apply conventional coating solutions or pastes to the substrate as a further layer in addition to the coating compositions according to the present invention. Conventional formulations of this type as top coats or adhesive coatings are described in detail in DE-A No. 2,457,387 (US-PS No. 4,035,213).

The coating compositions according to the present invention are preferably used as an adhesive coating in the reverse coating of textiles, leather or split leather. The top coat (preferably a solution or paste according to the present invention or even a conventional formulation) is first applied in a thickness of from about 20 to 80 g/m² to a suitable intermediate carrier (such as a steel strip, release paper, a silicone matrix and the like) and it is dried in a drying channel. The adhesive coating is then applied in a thickness of from 30 to 100 g/m² to the dried covering coating, the substrate is laminated thereto and the coating is baked in a further drying channel at about 110° to 160° C. and preferably at about 120° to 140° C. Finally, the coated substrate is separated from the intermediate carrier.

As was already mentioned the coating compositions according to the present invention may not only be applied by the so-called reverse coating process, but may also be applied to the textile substrate in the direct coating process.

To apply the coating compositions in the form of solutions in the reverse or in the direct coating process, known apparatus such as the knife-over roll coater, the knife-on-blanket coater and the reverse roll coater, among others, are used. Moreover, modern apparatus such as the silk screen and the engraved printing roller may also be advantageously used for high-grade coating compositions.

The coating compositions according to the present invention may contain conventional quantities of various known auxiliaries and additives such as powder pigments, formed pigments, dyeing agents, UV-stabilizers, antioxidants, cross-linking catalysts, grip-influencing agents (such as silicones and cellulose esters), fillers (such as chalk, kaolin or heavy spar) and surface active-silica gels, among others. These auxiliaries and additives may be added to the starting materials, the polyurethane, the cross-linker or any of the mixtures according to the present invention at a suitable point.

The invention is further illustrated, but is not intended to be limited by the following examples in which all parts and percentages are by weight unless otherwise specified.

EXAMPLES

Production of Top Coat Solution D/1 (Not According to the Invention)

2000 g of butane diol-1,4/adipic acid polyester (1.0 mol) were reacted in 8555 g of DMF at 90° C. with 1380 g of 4,4'-diphenylmethane diisocyanate (5.5 mols) and 278 g of ethylene glycol (4.5 mols) until completely free of NCO. The 30% PUR-solution in DMF had a viscosity of 35,000 mPas/25° C. 4 weight % of titanium dioxide (based on solids content) was added to the above-mentioned PUR-solution for pigmentation (DMF=dimethylformamide).

Production of Adhesive Coating Solution H/1 (According to the Invention)

1000 g (0.5 mols) of a polyester based on adipic acid/1,6-hexane diol/neopentyl glycol (mol ratio of the glycols 65:35) having an OH number of 56, 500 g (0.25 mols) of a linear polypropylene glycol having an OH number of 56, 15 g (0.11 mols) of 2,2-bis(hydroxymethyl)propionic acid amide and 10 g (0.11 mols) of 1,4-butane diol were dissolved in 365 g of dimethylformamide to produce a solution. The solution was reacted with 168 g (0.97 mols) of an 80/20 mixture of 2,4-/2,6-diisocyanatotoluene at 80° C. During the reaction the solution was gradually diluted with 360 g of dimethylformamide. After a viscosity of about 14,000 mPas had been reached (at about 80° C.), 1 g (0.012 mols) of butanone oxime was added and the solution was subsequently stirred for about 1 hour at 80° C. The resulting polyurethane solution had a solids content of 70% and the viscosity of the solution was 42,000 mPas/23° C.

Production of Adhesive Coating Solution H/2 (According to the Invention)

1000 g (0.5 mols) of a polyester based on 1,6-hexane diol, neopentyl glycol and adipic acid having an OH number of 56 (as in the production of H/1), 500 g (0.25 mols) of a linear polypropylene glycol having an OH number of 56 and 31 g (0.23 mols) of 2,2-bis(hydroxymethyl)propionic acid amide were dissolved in 370 g of dimethylformamide to produce a 70% solution. The solution was reacted with 167 g (0.96 mols) of an 80/20 mixture of 2,4-/2,6-diisocyanatotoluene at 80° C. During the reaction the mixture was gradually diluted with 360 g of dimethylformamide. The mixture was stirred until a viscosity of about 16,000 mPas was reached (at 80° C.). The product was reacted with 1.0 g (0.012 mols) of butanone oxime and subsequently stirred for about 1 hour at 80° C. The viscosity of the solution was 50,000 mPas/23° C.

Production of Adhesive Coating Solution H/3 (According to the Invention)

1000 g (0.5 mols) of a polyester based on 1,6-hexane diol, neopentyl glycol and adipic acid having an OH number of 56 (as in H/1), 1000 g (0.5 mols) of a polyester based on adipic acid, 1,4-butane diol and ethylene glycol (mol ratio of the diols 1:1) having an OH number of 56 and 44 g (0.33 mols) of 2,2-bis(hydroxymethyl)-propionic acid amide were dissolved in 490 g of dimethylformamide to produce a solution. The solution was reacted with 220 g (126 mols) of an 80/20 mixture of 2,4-/2,6-diisocyanatotoluene at 80° C. During the reaction the mixture was gradually diluted with 490 g of dimethylformamide. After a viscosity of about 11,000 mPas had been reached (at 80° C.), 2.0 g (0.023 mols) of butanone oxime was added and the solution was subsequently stirred for about 1 hour at 80° C. The resulting polyurethane solution had a solids content of 70% and the final viscosity of the solution was 39,000 mPas/23° C.

Production of Adhesive Coating Solution H/4 (According to the Invention)

2550 g (1.0 mol) of a polyester based on diethylene glycol and adipic acid having an OH number of 44 were reacted with 333 g (1.5 mols) of 3,3,5-trimethyl-5-isocyanatomethyl cyclohexyl isocyanate and 84 g (0.5 mols) of 1,6-hexanediisocyanate at 100° C. in the melt to produce an NCO prepolymer for the production of the 65% polyurethane solution.

The melt was dissolved in 500 g of toluene and 500 g of dimethylformamide and reacted with 126 g (0.95 mols) of 2,2-bis(hydroxymethyl)propionic acid amide at 80° C. After a viscosity of about 20,000 mPas had been reached (at 80° C.) the product was reacted with 4.5 g (0.052 mols) of butanone oxime and was diluted with 500 g of isopropanol. The resulting polyurethane solution had a solids content of about 65% and the final viscosity of the solution was 30,000 mPas/25° C.

Production of 70% Adhesive Coating Solutions without Dimethylolpropionic Acid Amide (For Comparative Experiments)

HV/1 (Comparison)

1000 g (0.5 mols) of a polyester based on 1,6-hexane diol, neopentyl glycol and adipic acid having an OH number of 56 (as in H/1), 500 g (0.25 mols) of a linear polypropylene glycol having an OH number of 56 and 20.7 g (0.23 mols) of 1,4-butane diol were reacted with 162 g (0.93 mols) of an 80/20 mixture of 2,4-/2,6-diisocyanatotoluene at 80° C. to produce the 70% solution. During the reaction the mixture is gradually diluted with 720 g of dimethylformamide. After a viscosity of about 12,000 mPas had been reached (at 80° C.), 1 g (0.012 mols) of butanone oxime was added and the solution was subsequently stirred for about 1 hour at 80° C. The final viscosity of the solution was 40,000 mPas/23° C.

HV/2 (Comparison)

1333 g (0.67 mols) of the polyester from H/1 in admixture with 667 g (0.33 mol) of a polypropylene glycol ether were reacted in analogous manner with 277 g (1.60 mols) of 2,4-/2,6-toluylenediisocyanate and 54.0 g (0.60 mols) of butane diol-1,4 in 1000 g of DMF to produce a 70% PUR solution: the viscosity was 40,000 mPas/25° C.

HV/3 (Comparison)

1000 g (0.5 mols) of a polyester based on 1,6-hexane diol, neopentyl glycol and adipic acid having an OH number of 56 (as in H/1), 1000 g (0.5 mols) of a polyester based on 1,4-butane diol, ethylene glycol and adipic acid having an OH number of 56 (as in H/3) and 29.7 g (0.33 mols) of 1,4-butane diol were reacted with 220 g (1.26 mols) of an 80/20 mixture of 2,4-/2,6-diisocyanatotoluene at 80° C. to produce the 70% polyurethane solution. During the reaction the mixture was gradually diluted with 965 g of dimethylformamide. After a viscosity of about 12,000 mPas had been reached (at 80° C.), 2.0 g (0.023 mols) of butanone oxime were added and the solution was subsequently stirred for about 1 hour at 80° C. The viscosity of the solution was 35,000 mPas/23° C.

Preparation of the Adhesive Coating Pastes

In each case from 70 to 100 g of an about 50% commercial formaldehyde/melamine resin (melamine hexamethylol ether) as a cross-linker and from 20 to 30 g of a 20% solution of p-toluene sulphonic acid in DMF (or isopropanol) as a catalyst were introduced into 1000 g of the adhesive coating solutions H/1-H/4 (according to the present invention) and HV/1-HV/3 (comparison).

General Coating Method

In a coating machine, the top solution D/1 was spread onto release paper by means of a knife-over-roll coater: 100 to 150 g/m2 of the solution were applied. After passage through a drying channel which had an air temperature of 100° C. at the inlet and 140° C. at the outlet, the adhesive coating solutions H/1-H/4 and HV/1-HV/3 were spread in an analogous manner in a second coating machine onto the dried top coat in a quantity of from 50 to 150 g/m 2 . A roughened cotton-polyester product weighing 180 g/m2 was applied to the wet adhesive coat and passed through a drying channel where the solvent was evaporated. The adhesive coat was cross-linked at elevated temperature (from 130/140° to 50/160° C.). On emerging from the drying channel the release paper was removed and the coated length of fabric was rolled up.

The quality of the coatings was judged by examining the adhesion on the BW/PES-yarn after hydrolysis aging. The results were compiled in the following Table. It can be seen that the combination according to the present invention (top coat D/1 +adhesive coat H/1-4) is markedly superior to the products of prior art (top coat D/1 +adhesive coat HV/1-3).

The hydrolysis aging (7 day or 14 day storage at 70° C. and 95% R.H.) does not have a negative influence on the combinations according to.the present invention and adhesion to the fabric is good.

It can be seen in the comparative experiment that the cross-linking of the adhesive coating is not sufficient at the lower stoving temperature of from 130° to 140° C.

During hydrolysis ageing, the coating of the comparative examples decomposed.

If a more elevated hardening temperature or a greater quantity of catalyst was used, this produced an improvement. But even then the coating was inferior to the coating according to the present invention.

| Adhesive coating number | | Concentration (%) of the solution of the coating composition | Chain lengthening agent per mold of relatively high molecular weight hydroxyl compound (B = Butane diol-1,4; DMPSA = dimethylol propionic acid amide) | Cross-linking resin/catalyst (%) | Cross-linking temperature (°C.) | Chemical resistance (a) | (b) | (c) | Adhesion on BWA/PES-yarn roughened 180 g/m² |
|---|---|---|---|---|---|---|---|---|---|
| H1 | according | 70 | 0.15 B; 0.15 DMPSA | 10/2 | 130/140 | + | + | + | + |
| H2 | to the | 70 | 0.30 DMPSA | 10/2 | 130/140 | + | + | + | + |
| H3 | present | 70 | 0.33 DMPSA | 10/2 | 130/140 | + | + | + | + |
| H4 | invention | 65 | 0.95 DMPSA | 7/2 | 130/140 | + | + | + | + |
| HV1 |  | 70 | 0.3 B | 10/2 | 130/140 | + | − | − | − |
| HV1 |  |  | 0.3 B | 10/3 | 130/140 | + | + | − | 0 |
| HV1 | Comparisons |  | 0.3 B | 10/2 | 150/160 | + | + | − | 0 |
| HV2 |  | 70 | 0.6 B | 10/2 | 130/140 | + | − | − | − |
| HV3 |  | 70 | 0.33 B | 0/2 | 130/140 | + | − | − | − |

(a) = original
(b) = after 7 day hydrolysis ageing
(c) = after 14 day hydrolysis ageing
+ = ok, no negative results
0 = only just adequate
− = unsatisfactory, non-usable
BW/PES = cotton/polyester-mixed yarn Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which is cross-linkable by heating which comprises a mixture of
(A) a substantially linear polyurethane polymer which is based on a relatively high molecular weight polyol, a diisocyanate and a chain lengthening agent, and additionally contains 2,2-bis(hydroxymethyl)-propionic acid amide in a quantity of about 0.5 to 10% by weight, based on the weight of said polyurethane polymer, as the sole chain lengthening agent or a portion thereof, and
(B) melamine- and/or urea-formaldehyde resins.

2. The coating composition of claim 1 wherein said 2,2-bis(hydroxymethyl)propionic acid amide is present in an amount of about 0.75 to 7.5% by weight, based on the weight of said polyurethane polymer.

3. The coating composition of claim 1 wherein in addition to 2,2-bis(hydroxymethyl)propionic acid amide, said chain lengthening agent additionally comprises a diol having a molecular weight of 62 to 399.

4. The coating composition of claim 1 wherein component (B) is present in an amount of about 2 to 20% by weight, based on the solids content of said coating composition.

5. The coating composition of claim 1 which additionally contains a solvent.

6. A coating composition which is cross-linkable by heating and is present as a solution in an organic solvent comprising
(A) a substantially linear polyurethane polymer which is based on
(1) a polyol having a molecular weight of 400 to about 6000,
(2) a diisocyanate and
(3) a chain lengthening agent which comprises 2,2-bis(hydroxymethyl)propionic acid amide in an amount of about 0.5 to 10% by weight, based on the weight of said polyurethane polymer and
(B) about 2 to 20% by weight, based on the solids content of said coating composition, of a melamine- and/or urea-formaldehyde resin.

7. The coating composition of claim 6 wherein said chain lengthening agent additionally comprises a low molecular weight diol having a molecular weight of 62 to 399.

8. A process for the preparation of a coating composition which comprises
(A) preparing a substantially linear polyurethane polymer by reacting a diisocyanate with a relatively high molecular weight diol and a chain lengthening agent which comprises 2,2-bis(hydroxymethyl)propionic acid amide in an amount of about 0.5 to 10% by weight, based on the weight of said polyurethane polymer, as the sole chain lengthening agent or a portion thereof and
(B) mixing said polyurethane polymer with a melamine- and/or urea-formaldehyde resin and, optionally, an organic solvent.

9. In the process for preparing a coated textile substrate by using an adhesive coat to bond a topcoat to a textile substrate, the improvement which comprises using the coating composition of claim 1 as the adhesive coating.

* * * * *